United States Patent
Gaucher et al.

(10) Patent No.: US 10,988,116 B2
(45) Date of Patent: Apr. 27, 2021

(54) ADAPTER FOR A WIPER BLADE

(71) Applicant: Valeo Systèmes d'Essuyage, Le Mesnil Saint Denis (FR)

(72) Inventors: Vincent Gaucher, Issoire (FR); Stéphane Houssat, Issoire (FR); Olivier Jomard, Issoire (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 340 days.

(21) Appl. No.: 15/839,057

(22) Filed: Dec. 12, 2017

(65) Prior Publication Data

US 2018/0162326 A1    Jun. 14, 2018

(30) Foreign Application Priority Data

Dec. 13, 2016   (FR) ........................ 1662350

(51) Int. Cl.
*B60S 1/38*        (2006.01)
*B60S 1/40*        (2006.01)

(52) U.S. Cl.
CPC ............ *B60S 1/387* (2013.01); *B60S 1/3851* (2013.01); *B60S 1/4048* (2013.01); *B60S 2001/4051* (2013.01); *B60S 2001/4054* (2013.01); *B60S 2001/4058* (2013.01); *B60S 2001/4061* (2013.01)

(58) Field of Classification Search
CPC .................. B60S 1/4045; B60S 1/4048; B60S 2001/4051; B60S 2001/4054; B60S 2001/4058; B60S 2001/4061; B60S 1/387; B60S 1/3851
USPC ...................................................... 15/250.32
See application file for complete search history.

(56) References Cited

U.S. PATENT DOCUMENTS

| 2010/0005609 A1* | 1/2010 | Kim ...................... B60S 1/4003 15/250.32 |
| 2013/0152330 A1 | 6/2013 | Kim et al. |
| 2013/0192016 A1 | 8/2013 | Kim et al. |

FOREIGN PATENT DOCUMENTS

| EP | 2143603 A2 | 1/2010 |
| KR | 20120109192 A | 10/2012 |

OTHER PUBLICATIONS

Preliminary Search Report and Written Opinion issued in corresponding French Application No. FR1662350, dated Aug. 29, 2017 (5 pages).

* cited by examiner

*Primary Examiner* — Gary K. Graham
(74) *Attorney, Agent, or Firm* — Osha Bergman Watanabe & Burton LLP (57) ABSTRACT

An adapter (2) intended to link a wiper blade (1) to a driving arm (3) of a vehicle wiping system, the adapter (2) comprising a head (11) and a body (12) held together by means of an attachment device (80), the head (11) having a U-shaped cross section formed from at least one top wall (11a) from which at least two side walls (11b) extend, the body (12) having a U-shaped cross section formed from at least one top panel (12a) from which at least two side walls extend (12b), the U-shaped cross section of the head (11) delimiting an inner space (38) configured to at least partially receive the body (12), characterized in that the adapter (2) comprises at least one guide member for guiding the head (11) relative to the body (12).

14 Claims, 4 Drawing Sheets

ADAPTER FOR A WIPER BLADE

The present invention concerns wiping systems for motor vehicles, and more particularly concerns an adapter that is a component of such a wiping system.

A wiping system, commonly referred to as windscreen wipers, for a motor vehicle, is designed to sweep away the liquids and dirt that can disturb the view that a driver of the motor vehicle has of his or her surroundings. This wiping system also comprises a driving arm that performs an angular reciprocating movement about a rotational axis, and an elongate wiper blade equipped with a scraper strip produced from an elastic material. By rubbing against a front or rear glass surface of the motor vehicle, the scraper strip sweeps from said surface the water and a certain amount of dirt, removing it from the field of view of the driver.

Regardless of the configuration of the wiper blade, i.e. whether it is a wiper blade comprising articulated brackets that hold the scraper strip in several separate areas, or a wiper blade comprising a metal strip that holds the scraper strip along its entire length, the wiper blade is attached to an end portion of the driving arm by means of a connection device that comprises a connector secured to the wiper blade.

In a first known linking method, an adapter, suitable for being assembled with the connector of the wiper blade, is mounted movably so as to be able to pivot about an attachment axis on the end portion of the driving arm. This first linking method is commonly used for windscreen wipers intended for glass surfaces situated at the front of the motor vehicle. In a second known linking method, the connector is connected to a shaft secured to the driving arm. This second linking method is commonly found in windscreen wipers intended for glass surfaces situated at the rear of the motor vehicle.

A general problem that exists in the field lies in the need to correctly mount the wiper blade on the driving arm. If mounted incorrectly, a wiper blade can become a potential danger due to the possibility of it becoming separated from the driving arm, in particular under the action of the centrifugal force generated by the rotational movement of the driving arm. In such a situation, the wiper blade can be thrown onto a user, onto another vehicle or onto the road, thus representing a danger.

It is therefore desirable to provide a mounting system that offers ease of mounting while ensuring the wiper blade is held securely. More particularly, it is desirable to have an adapter capable of engaging in an effective and long-lasting manner with an end portion of the driving arm, which is likely to be produced in a variety of shapes.

One aim of the present invention is to propose an adapter that is arranged to be easily mounted, without the risk of error or incomplete mounting.

An adapter of the present invention is an adapter intended to link a wiper blade to a driving arm of a vehicle wiping system. The adapter comprises a head and a body held together by means of an attachment device, the head having a U-shaped cross section formed from at least one top wall from which at least two side walls extend, the body having a U-shaped cross section formed from at least one top panel from which at least two side panels extend. The adapter comprises at least one guide member for guiding the head relative to the body.

This configuration has the advantage of simplifying the mounting of the adapter linking the driving arm to the wiper blade. This increased simplicity accordingly reduces the risk of an error during assembly, and therefore the risk of the wiper being thrown loose, as mentioned above.

The adapter that is the subject matter of the invention has the advantage of being particularly well suited to a driving arm that has a U-shaped end portion with an orifice on top and slots on the sides.

The adapter advantageously comprises at least any one of the following features, taken alone or in combination:

- the head and the body are parts manufactured separately and are connected to each other by the attachment device,
- such an attachment device provides a mechanical link between the body and the head,
- the head is removable from the body,
- the guide member aligns the head with respect to the body, so as to effect the mechanical link created by the attachment device,
- the U-shaped cross section of the head delimits an inner space configured to at least partially receive the body, and advantageously to receive only a portion of the body,
- the attachment device is a combination of complementary shapes between the head and the body. The head carries a first element that is arranged to collaborate with a second element carried by the body, the collaboration between the two elements holding the head on the body,
- the guide member comprises at least one leg that extends into at least one cavity,
- the leg is arranged on the body of the adapter, the cavity being arranged in the head,
- the leg is arranged on the head of the adapter, the cavity being arranged in the body,
- the guide member extends into the inner volume of the head. More particularly, the guide member extends from an inner surface of the head, i.e. a surface of the head that faces the inner volume,
- the guide member comprises at least one leg. Advantageously, the guide member comprises two legs, each extending into a separate cavity. One leg extends into one cavity, until a free end of the leg meets a bottom of the cavity, the free end being the portion of the leg opposite the portion extending from the adapter. Alternatively, the leg extends into the cavity, and contact is made between the head and the body when a base of the leg comes into contact with a surface of the side walls of the body,
- a cross section of the leg is complementary to a cross section of the cavity. The cross section of the leg is, in particular, smaller than the cross section of the cavity that receives it, but without excessive play,
- the attachment device comprises a locking hole arranged in a side wall of the head that engages with a pin that projects from a surface of the side wall of the body,
- the leg of the guide member extends in a longitudinal direction that is parallel to a longitudinal direction of extension of the locking hole,
- the longitudinal directions of the leg and of the locking hole are parallel to a longitudinal direction of the adapter,
- the longitudinal directions of the leg and of the locking hole are perpendicular to a longitudinal direction of the adapter,
- the locking hole comprises a circular opening and a channel linking one edge of the head to the circular opening,
- the channel is bordered by at least one slit, the adapter comprises a means for rotationally linking with a connector secured to the wiper blade, the body of the adapter comprises at least one immobilization device for attaching the adapter to an end portion of the driving arm, the immobilization device is in the form of a button that projects from the top wall of the body, the button being configured to cooperate with an orifice arranged in a top wall of the end portion, the head is configured to cover an end strip of the end portion of the driving an The present invention also concerns a connection device formed from a connector and an adapter as described above, the connector being a part mounted in rotation on the adapter and arranged to carry the wiper blade.

The present invention also concerns a wiper blade comprising an adapter as described above or a connection device as described above, such an adapter being able to be mounted on the wiper blade.

The present invention further concerns a wiping system comprising a driving arm, a connector secured to a wiper blade and an adapter as described above rotatably linking the connector to the driving arm.

The present invention finally concerns a method for assembling a wiping system comprising at least a step of assembling a body of an adapter on a connector, a step of assembling an end portion of a driving arm on the adapter and a step of assembling a head of the adapter on the body of the adapter, the body receiving the head via a surface chosen from a front surface or a top surface of the body.

Other features, details and advantages of the invention will become clearer on reading the description that follows as an example, with reference to the drawings in which.

Figure 1:
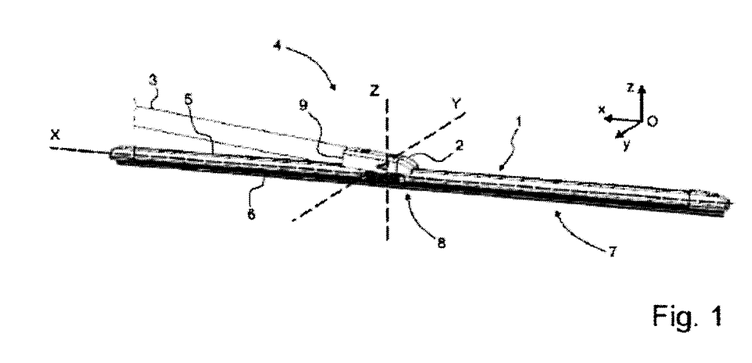
FIG. 1 is a perspective view of a wiping system according to the invention.

In the figures, the designations "longitudinal", "transverse", "vertical", "side", "front", "back", "left", "right", "top" and "bottom" refer to the orientation of a wiper blade 1 shown in FIG. 1. A longitudinal direction corresponds to a longitudinal axis X along which the wiper blade 1 and/or an adapter 2 of the present invention extend. A transverse direction corresponds to that of a transverse axis Y that is perpendicular to the longitudinal axis X. The designations "left" and "right" should be considered with respect to a position along the transverse axis Y, to either side of the longitudinal axis X. A vertical direction, parallel to that of a vertical axis Z, is perpendicular to the abovementioned longitudinal and transverse directions. The designations "top" or "bottom" refer to orientations parallel to the vertical axis Z, the term "bottom" containing the plane of the windscreen. With respect to the longitudinal directions, the designations "external" or "internal" should be considered with respect to a pivot point where the wiper blade 1 pivots on a driving arm 3 of the wiper blade 1, the designation "internal" corresponding to the portion where the driving arm 3 and one half-blade extend, the designation "external" corresponding to the portion where the other half-blade extends.

The abovementioned directions can also be shown as an orthonormal coordinate system Oxyz included in the figures. In this coordinate system, the Ox axis represents the longitudinal direction, the Oy axis represents the transverse direction, and the Oz axis represents the vertical direction.

In FIG. 1, a motor vehicle is commonly equipped with a wiping system 4 for removing water and/or dirt present on a glass surface, in particular a rear window or a windscreen of a motor vehicle. The wiping system 4 comprises the driving arm 3 that is capable of performing an angular reciprocating movement along and above the glass surface.

The wiping system 4 also comprises the wiper blade 1 that extends along a main axis, referred to as longitudinal direction X, parallel to the Ox axis. The wiper blade 1 comprises at least an air deflector 5 and a scraper strip 6. The air deflector 5 is designed to transform a pressure applied by a flow of air flowing along the glass surface into a force pressing the wiper blade 1 against the glass surface of the motor vehicle. The scraper strip 6 is the part of the wiper blade 1 in direct contact with the glass surface for removing the water and/or dirt present on the latter. The air deflector 5 and the scraper strip 6 form a semi-rigid assembly 7 that is carried by a connection device 8, interposed between the driving arm 3 and the semi-rigid assembly 7.

The connection device 8 provides a mechanical link between an end portion 9 of the driving arm 3 and the wiper blade 1 and thus allows the wiper blade 1 to be separated from the driving arm 3, in order to replace the wiper blade 1.

Figure 2:
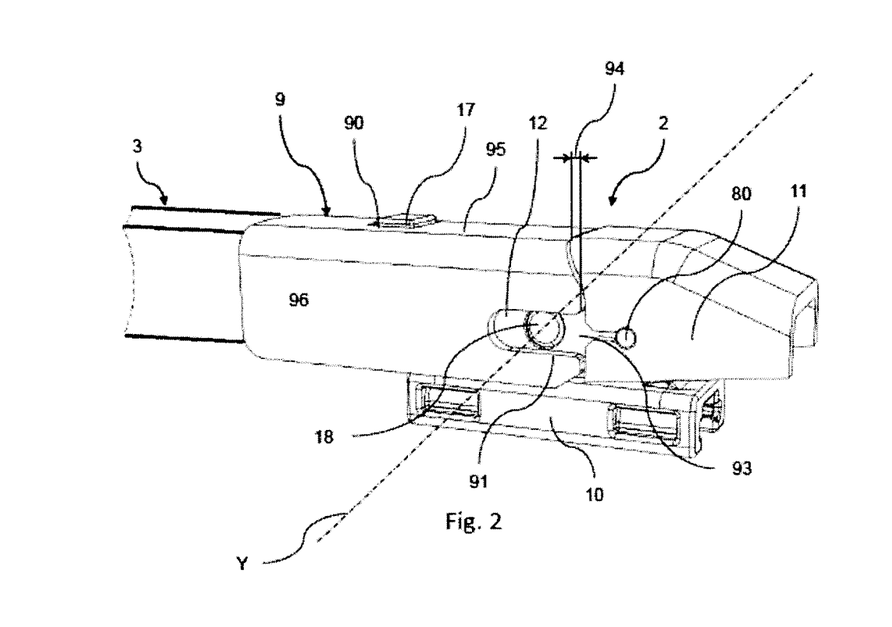
FIG. 2 is a view of a connection device of the present invention forming part of the wiping system shown in FIG. 1.

Generally, the connection device 8 of the present invention comprises three parts: two parts constituting the adapter 2 and one connector 10, seen together in FIG. 2, which shows the adapter 2 of the present invention in the usage position. In this usage position, the adapter 2 is attached onto the end portion 9 of the driving arm 3, according to a method of the invention described below.

The connector 10 is suitable for carrying the wiper blade 1 and is mounted in rotation on the adapter 2. The adapter 2 is designed to be attached to the end portion 9 of the driving arm 3. According to an embodiment of the invention, the adapter 2 and the connector 10 are produced by molding a synthetic material, for example a material from the polyoxymethylene family, known by the acronym POM, or by molding a mixture of polymer materials, for example a mixture of polymers from the polycarbonate family and the acrylonitrile butadiene styrene family, known by the acronym ABS. The connector 10 is a single-piece component. In other words, the connector 10 is a one-piece assembly and can only be split into several pieces by destroying the connector 10. The end portion 9 is produced, for example, by folding a metal strip, such as a sheet made from steel, aluminum or similar or indeed by molding a synthetic material.

Figure 3:
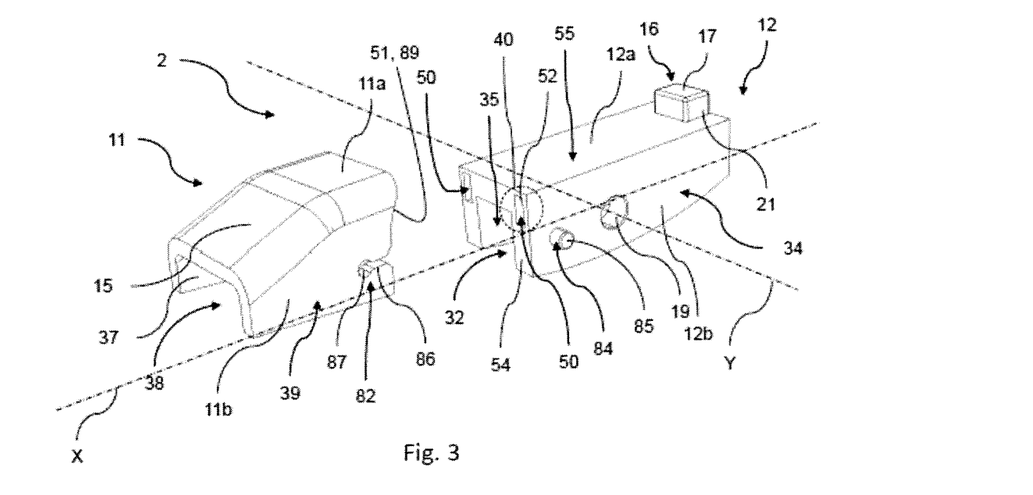
FIG. 3 is an exploded view of a first example of an adapter according to the invention.

Referring to FIG. 3, the adapter 2 extends in the longitudinal direction X and comprises at least a head 11 and a body 12.

The head 11 and the body 12 each have a U-shaped transverse profile. In other words, in a transverse cross-section made according to a cutting plane parallel to the Oyz plane, the head 11 and the body 12 comprise a U-shaped transverse profile. In other words, the head 11 comprises a top wall 11a that forms the base of the U and two side walls 11b, in particular parallel or substantially parallel to each other and orthogonal or substantially orthogonal to the top wall 11a, that form the arms of the U, while the body 12 comprises a top panel 12a that forms the base of the U-shape and two side panels 12b, substantially parallel to each other and substantially orthogonal to the top panel 12a, that form the arms of the U.

The head 11 comprises a first portion and a second portion 15, the second portion 15 being inclined relative to the first portion.

The U shape of the head delimits an inner space 38 arranged to at least partially receive the body 12. The top wall 11a and the side walls 11b comprise an inner surface 37. The inner surface 37 faces the inner space 38.

The U shape of the body 12 delimits an inner volume 32 arranged to at least partially receive the connector 10 secured to the wiper blade 1. The side panels 12b comprise an outer surface 34 and an inner surface 35, the inner surface 35 facing the inner volume 32, the outer surface 34 being the surface opposite the inner surface 35. The top panel 12a comprises a top surface 55 that is the surface of the top panel 12a opposite the surface from which the side panels 12b project.

Figure 6:
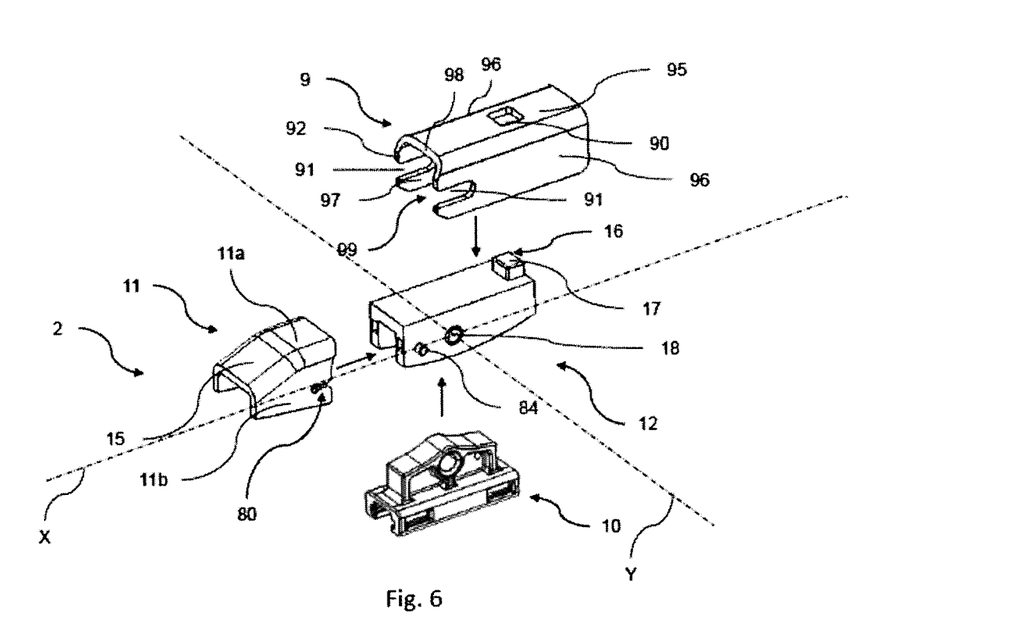
FIG. 6 is an exploded view of the connection device comprising the first example of an adapter according to the invention.

The side panels 12b comprise a hole 19 with a round cross section arranged to receive a rotation means 18 shown in FIG. 6. Each side panel 12b comprises a hole 19, the two holes 19 being aligned along an axis parallel to the axis Oy and corresponding to the axis about which the wiper blade can rotate to follow the curvature of the glass surface to be wiped.

Figure 4:
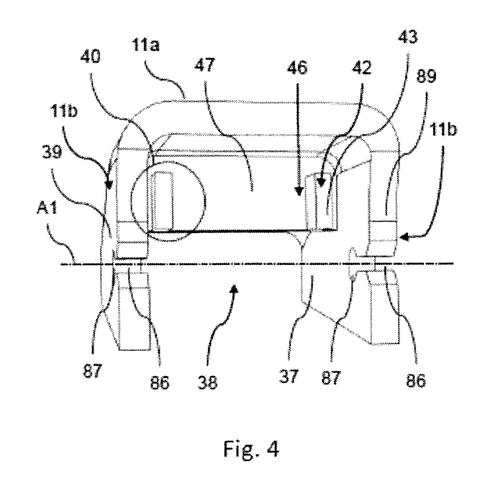
FIG. 4 is a perspective view of an example of a head shaped to fit on the body of the first example of an adapter according to the invention.

The head 11 and the body 12 of the adapter 2 are arranged relative to each other by a guide member 40, shown in FIG. 4. Said guide member 40 comprises a leg 42 and a cavity 50.

In a first variant of the adapter 2 according to the invention, the head 11 of the adapter 2 carries at least one leg 42, and in particular two legs 42, collaborating with two cavities 50 arranged in the body 12 of the adapter 2.

In reference to FIG. 4, which shows a first example of this variant, the legs 42 and the cavities 50 extend in a longitudinal direction parallel to a longitudinal direction of the head 12. In other words, the legs 42 and the cavities 50 extend in a longitudinal direction parallel to the longitudinal direction of extension X of the adapter 2, and therefore of the wiper blade 1. The legs extend, in particular, in a longitudinal direction 62.

The legs 42 extend in the direction of the body 12. The leg 42 comprises a base. This base can have two different shapes.

In the first shape, shown in FIG. 4, the legs 42 share the same base 46. This base 46 is arranged in the form of a wall 47 extending from the inner surface 37 of the top wall 11a and the side walls 11b of the head 11. The legs 42 project from this wall 47 and extend towards the cavities 50.

Figure 5:
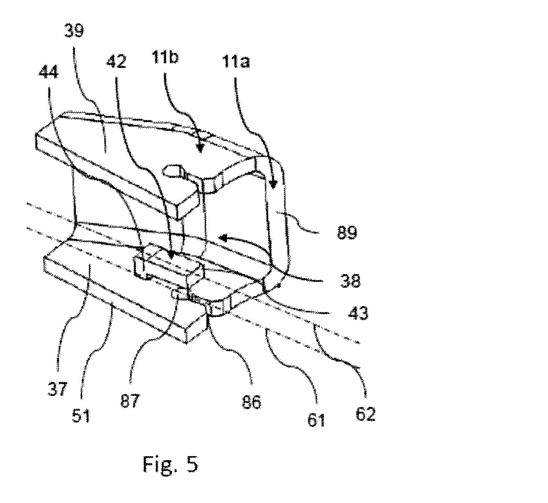
FIG. 5 is a perspective view of an alternative example of a head shaped to fit on the body of the first example of an adapter according to the invention.

In the second shape, shown in FIG. 5, each leg 42 comprises its own base 44. The base 44 extends from the inner surface 37 of a side wall 11b of the head 11. The base 44 and the leg 42 are L-shaped, projected on a plane parallel to the extension plane of the top wall 11a.

Regardless of the shape of the base of the legs 42, the cavity 50 in FIG. 2 is, in this example, provided in the side panels 12b of the body 12 of the adapter 2. Advantageously, the body 12 comprises two cavities 50, provided in the side panels 12b of the body 12 of the adapter 2. More particularly, each side panel 12b comprises a cavity 50. The cavities 50 have an opening 52, for example with a rectangular cross section, and extend longitudinally towards the back of the body. The cavities 50 open on a front surface 54 of the body 12. The cavities 50 are not through-cavities and therefore comprise a bottom.

The head 11 is positioned relative to the body 12 by means of the collaboration between the legs 42 and the cavities 50, in particular the openings 52. The head 11 is in particular attached onto the body 12 from the front, i.e. by moving the head 11 in translation towards the body 12 in a direction parallel to the longitudinal direction X. In this example, the legs 42 are driven into the cavities 50 until contact is made between the front surface 54 of the body 12 and the base 44 and 46 of the legs 42 of the head 11. Alternatively, the legs 42 are driven into the cavities 50 until a free end 43 of the legs 42 meets the bottom of the cavity 50.

Still in reference to FIG. 2, the head 11 and the body 12 are secured to each other by means of an attachment device 80. This attachment device 80 comprises at least a pin 84 and a locking hole 82. The collaboration between a locking hole 82 and a pin 84 secures the head 11 and the body 12 together. The securing is effected by snap-fitting the attachment device 80 around the pin 84.

In the example described here, the attachment device 80 comprises a locking hole 82, arranged in the side walls 11b of the head 11. Advantageously, the attachment device 80 comprises two locking holes 82. Each side wall 11b thus comprises one locking hole 82. The locking hole 82 extends in a longitudinal direction 61. This longitudinal direction 61 is parallel to the longitudinal direction 62 of the leg 42.

This locking hole 82 comprises a channel 86 that merges with a circular opening 87. The channel 86 is provided in the side walls 11b of the head, and links the circular opening 87 to a rear edge 89 of the head 11. The cross section of the pin 84 is smaller than the circumference of the circular opening 87. The channel 86 and the circular opening 87 are through-openings, i.e. they link the inner surface 37 of the head 11 to an outer surface 39 of the head 11. In the example of the guide member 40 comprising legs 42 with separate bases 44, the legs 42 and the locking holes 82 are aligned in a same plane. In the example of the guide member 40 comprising legs 42 with a shared base 46, the locking holes 82 and the legs 42 extend in two separate and parallel planes.

In another embodiment of this variant of the invention, the channel 86 of the attachment device 80 is bordered to either side by a slit 88. The slit 88 is arranged to allow the elastic deformation of the section 83 of the side walls 11b arranged between the channel 86 and the slit 88 in question. This elastic deformation allows the locking hole 82 to snap fit around the pin 84 with which the locking hole 82 collaborates.

The pin 84, which has a circular cylindrical shape, extends from the outer surface 34 of the side panels 12b of the body 12. Advantageously, according to the example described here, the body 12 comprises two pins 84, each arranged on one side panel 12b of the body 12. The height of the pin 84, i.e. the dimension between the side panel 12b that carries the pin 84 and an end surface 85 of the pin 84, is, for example, less than or equal to the thickness of the side wall 11b of the head 11. The thickness of the side wall 11b of the head 11 is the dimension between the inner surface 37 and the outer surface 39 of the side wall 11b.

The insertion of the legs 42 into the cavities 50 via the openings 52 helps position the channels 86 of the locking holes 82 opposite the pins 84 of the body 12, so as to allow the head 11 to snap fit into the continuity of the body 12. The two parts of the adapter 2 are thus secured to each other. The attachment device 80 holds the head 11 onto the body 12.

Figure 7:
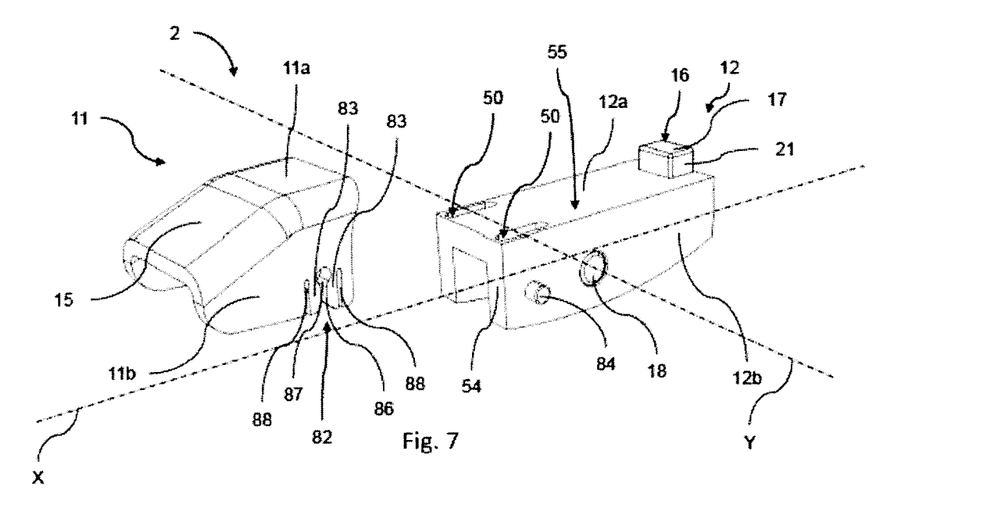
FIG. 7 is an exploded view of a second example of an adapter according to the invention.
Figure 8:
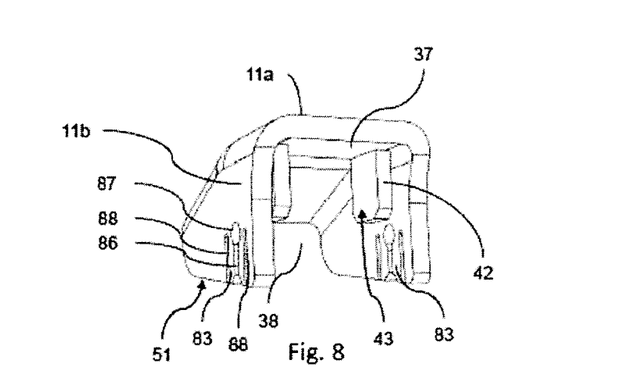
FIG. 8 is a perspective view of an example of a head shaped to fit on the body of the second example of an adapter according to the invention.

In a second example, shown in FIGS. 7 and 8, the legs 42 and the cavities 50 extend in a longitudinal direction perpendicular to the longitudinal direction of the head 11. In other words, the legs 42 and the cavities 50 extend in a longitudinal direction perpendicular to the longitudinal direction of extension X of the adapter 2, and therefore of the wiper blade 1.

As shown in FIG. 8, the legs 42 extend from the inner surface 37 of the top wall 11a of the head 11.

The cavities 50 open on the top panel 12a of the body and extend into the side panels 12b. The cavities 50 have an opening 52 with a cross section that is rectangular, or in any case complementary to the cross section of the leg 42 that the cavity 50 receives.

The head 11 is positioned relative to the body 12 via the guide member 40, by means of the collaboration between the legs 42 and the cavities 50, in particular the openings 52. The head 11 is in particular attached onto the body 12 from the top, i.e. by moving the head 11 in translation towards the body 12 in a direction parallel to the vertical direction Oz, which is a direction perpendicular to the longitudinal axis X and the transverse axis Y. In this example, the legs 42 are driven into the cavities 50 until contact is made between the top panel 12a of the body 12 and the inner surface 37 of the top wall 11a of the head 11. Alternatively, the legs 42 are driven into the cavities 50 until a free end 43 of the legs 42 meets the bottom of the cavity 50.

The attachment device 80 is arranged differently with respect to its arrangement in the first example of the adapter according to the invention. It comprises a locking hole 82, arranged in the side walls 11b of the head 11, the locking hole 82 comprising a channel 86 linking an inner edge 51 of the side walls 11b, shown in FIG. 3, to a circular opening 87. The channel 86 of the attachment device 80 is bordered to either side by a slit 88. The slit 88 is arranged to allow the elastic deformation of the section 83 of the side walls 11b arranged between the channel 86 and the slit 88 in question. This elastic deformation allows the locking hole 82 to snap fit around the pin 84 with which the locking hole 82 collaborates.

The pins 84 of the attachment device 80 are arranged in a manner identical to their arrangement in the first example. In particular, they project in the same way from the side panels 12b of body 12. They have the same circular cylindrical shape, and their circumference is smaller than that of the corresponding cylindrical opening 87.

According to a variant of the invention, the adapter can be shaped differently. Said shape is different, in particular, in that the leg of the guide member is carried not by the head of the adapter, but by the body of the adapter, the head comprising at least one cavity.

In a first example of this variant, the leg and the cavity extend in a longitudinal direction parallel to a longitudinal direction of the head, i.e. along the longitudinal direction X of the adapter. The guide member comprises, in particular, two legs, arranged on the front surface of the body of the adapter.

More particularly, the legs extend from the front surface of the side panels of the body. They collaborate with two cavities provided in the head and arranged in a wall extending from the inner surface of the top walls and the side walls of the head.

In a second example of this variant, the legs and the cavity extend in a longitudinal direction perpendicular to the longitudinal direction of the head, i.e. perpendicular to the longitudinal direction X of the adapter. The legs extend from the top wall of the body. The legs collaborate with two cavities provided in the head and arranged in the top wall of the head. The cavities are through-cavities and thus each comprises two openings that open into the inner space of the head. In an alternative example, the cavities are not through-cavities, and are therefore delimited by a bottom.

In the two cases, the adapter comprises an attachment device arranged in an identical manner to the first variant. Thus, the attachment device is arranged in an identical manner to its configuration in the first variant. It comprises two locking holes each comprising a channel and a circular opening, and collaborating with two pins. The pins have a circular cylindrical shape and extend from the outer surface of the side panels of the body. The height of the pin is, for example, less than or equal to the thickness of the side wall of the head. The head is attached to the body by snap fitting the locking holes around the pins. In the case of the adapter in which the guide member and the cavity extend in a longitudinal direction perpendicular to the longitudinal direction of the head, each channel is flanked by two slits.

Regardless of the variant in question, once mounted together, the head 11 and the body 12 are aligned. The top wall 11a and the top panel 12a extend in different parallel planes, and each of the side walls 11b and the side panels 12b extend in different planes parallel to each other.

The adapter 2 further comprises a rotation means 18 arranged to link the adapter 2 to the connector 10, while allowing one to rotate relative to the other. This rotation means 18 allows this rotation about the transverse axis Y. The rotation means 18 can be formed from a pair of strands that project into the recessed structure of the adapter 2. It can also consist of bearings arranged in the side walls 11b, as shown in the figures.

Advantageously, the rotation means 18 is arranged on the adapter 2 behind the pins 84, i.e. the pins 84 are arranged between the rotation means 18 and the front surface 54 of the body 12.

The body comprises an immobilization device 16, arranged to collaborate with an orifice 90 arranged on the end portion 9 of the driving arm 3. This immobilization device 16 is in the form of a button 17 having side surfaces 21.

Figure 9:
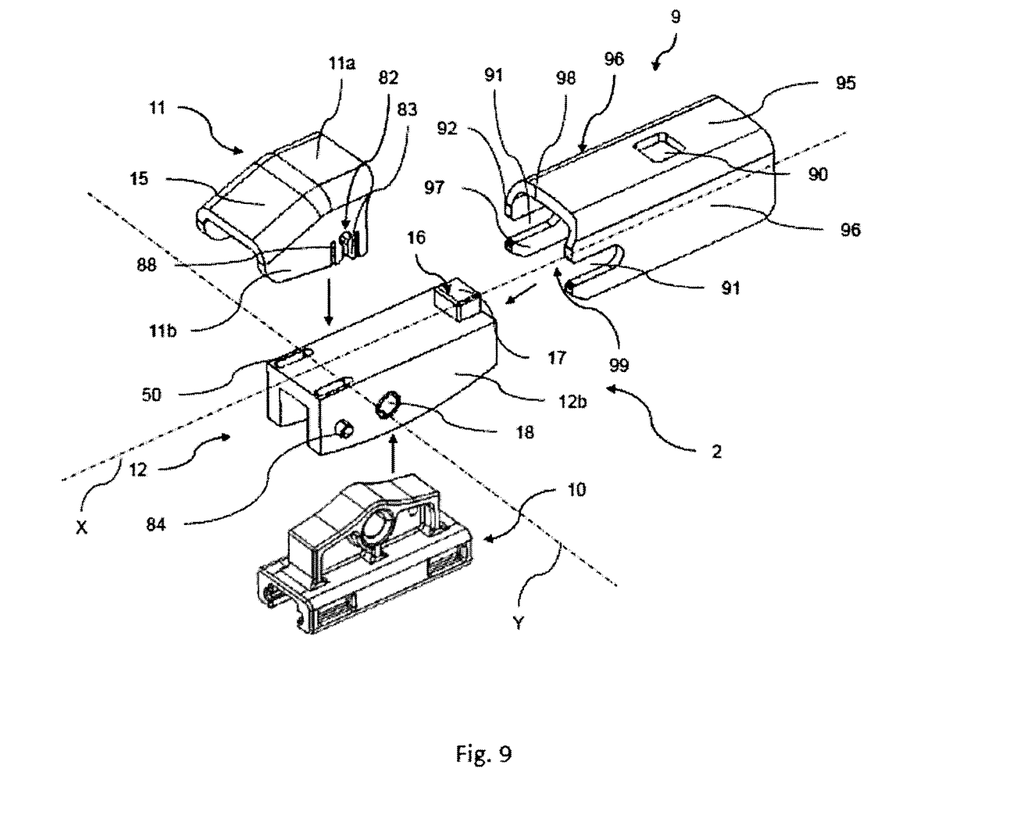
FIG. 9 is an exploded view of the connection device comprising the second example of an adapter according to the invention.

The end portion 9 of the driving arm 3, shown in FIG. 2, 6 or 9, is U shaped, when viewed in transverse cross-section parallel to the plane Oyz. The end portion 9 comprises a first wall 95 forming the base of the U and two substantially parallel second walls 96 forming the arms of the U.

The first wall 95 is provided with an orifice 90, the latter being centered laterally on the first wall 95 of the end portion 9. The first wall 95 and the second walls 96 are delimited at the front by a front rim 92 that has a U-shaped transverse profile.

The second walls 96 each comprise an inner surface 97 that delimits, with the first wall 95, an internal volume 99 of the end portion 9. The front rim 92 is provided with two slots 91, shown in FIG. 2, that are arranged longitudinally inside the second walls 96. The two slots 91 are arranged, facing each other, through a respective second wall 96. Each slot 91 comprises an opening 93 arranged in the front rim 92.

The wiping system 4 according to the invention is assembled according to the example described below. The assembly example described here is in no way limiting, the method being able to comprise additional steps or alternative steps, or said steps being able to be performed simultaneously or in a different order.

The connector 10 is rotatably linked to the body 12 by the rotation means 18. More particularly, the connector 10 is inserted into the inner volume 32 of the body 12 and secured by inserting the rotation means 18 into the holes 19 arranged in the side panels 12*b* of the body 12.

The body 12 of the adapter 2, equipped with the connector 10, is then inserted into the internal volume 99 of the end portion 9 of the driving arm 3. More particularly, the button 17 is inserted into the orifice 90.

The head 11 is positioned on the body 12 in the first variant by a translational movement parallel to the longitudinal axis Ox. The mounting of this variant is shown in FIG. 6. In the second variant, the head 11 is positioned on the body 12 by a translational movement parallel to the vertical axis Oz. The mounting of this variant is shown in FIG. 9. However, in both variants, the mounting principle is the same: the legs 42 of the guide member 40 are inserted into the cavities 50, and the pins 84 of the side panels 12*b* enter the locking holes 82 of the attachment device 80, passing through the channels 86 to be received in the circular openings 87.

Thus arranged, the head 11 covers an end strip 98 of the end portion 9. More particularly, the rear edge 89 of the head 11 is in contact with the end strip 98. This contact 94, shown in FIG. 2, prevents the adapter 2 from rotating relative to the end portion 9. Additionally, the head 11 presses the button 17 against a section of the first wall 95 and helps prevent the adapter 2 from rotating relative to the end portion 9.

The wiping system 4 is dismounted by performing the steps in reverse order. In particular, the head 11 is released from the body 12 by moving it in translation in the opposite direction to that used to position it on the body 12. The body 12 of the adapter 2 is then removed from the end portion 9 of the driving arm 3.

During normal, everyday use of the wiping system comprising a driving arm 3, a wiper blade 2 and a connection device 8, the movement of the driving arm 3 results in a centrifugal force acting on the adapter 2 and the wiper blade 1. This centrifugal force results mainly in a translational movement of the adapter 2 in a direction parallel to the axis Ox, in a direction away from the driving arm 3.

The button 17 of the adapter 2 collaborates with the orifice 90 of the end portion 9 of the driving arm 3, to secure the adapter 2 and the driving arm 3 together, despite the effect of the abovementioned centrifugal force. The side surfaces 21 of the button 17 abut against the side surfaces of the orifice 90.

The description above clearly explains how the invention can be used to achieve the stated aims and in particular to propose a two-part adapter allowing easy mounting on driving arms that are likely to be produced in a variety of shapes, and particularly on a driving arm comprising an end portion comprising oblong holes arranged in the seconds walls of the end portion and open on its front rim.

Naturally, various modifications can be made by a person skilled in the art to the adapter that has just been described as a non-limiting example, provided that at least one adapter is then implemented comprising a head and a body that are arranged relative to one another via a guide member and an attachment device.

In any case, the invention is not limited to the embodiment specifically described in this document, and extends, in particular, to all equivalent means and to any technically effective combination of these means.

The invention claimed is:

1. An adapter linking a wiper blade to a driving arm of a vehicle wiping system, the adapter comprising:
   a head; and
   a body held together by an attachment device, the head having a U-shaped cross section formed from at least one top wall from which at least two side walls extend, the body having a U-shaped cross section formed from at least one top panel from which at least two side walls extend; and
   at least one guide which guides the head in linear translation relative to the body before collaboration of the attachment device,
   wherein at least one of the side walls comprises a cavity with a substantially rectangular opening therein and defining a blind hole that is embedded in the at least one side wall such that all but one face of the cavity is surrounded by the at least one side wall, and
   wherein the attachment device comprises a locking hole arranged in a side wall of the head that engages with a pin that projects from a surface of one of the at least one side wall of the body.

2. The adapter as claimed in claim 1, in which the guide comprises at least one leg that extends into the cavity.

3. The adapter as claimed in claim 2, in which the leg is arranged on the body of the adapter, the cavity being arranged in the head.

4. The adapter as claimed in claim 2, in which the leg is arranged on the head of the adapter, the cavity being arranged in the body.

5. The adapter as claimed in claim 4, in which the leg extends into an inner space of the head.

6. The adapter as claimed in claim 2, in which a cross section of the at least one leg is complementary to a cross section of the cavity.

7. The adapter as claimed in claim 2, in which the at least one leg of the guide extends in a longitudinal direction that is parallel to a longitudinal direction of extension of the locking hole.

8. The adapter as claimed in claim 7, in which the longitudinal directions of the at least one leg and of the locking hole are parallel to a longitudinal direction of the adapter.

9. The adapter as claimed in claim 7, in which the longitudinal directions of the at least one leg and the locking hole are perpendicular to a longitudinal direction of the adapter.

10. The adapter as claimed in claim 1, in which the locking hole comprises a channel and a circular opening, the channel linking one edge of the head to the circular opening.

11. The adapter as claimed in claim 10, in which the channel is bordered by at least one slit.

12. The adapter as claimed in claim 1, in which the head is configured to cover an end strip of an end portion of the driving arm.

13. A connection device comprising:
    a connector; and
    an adapter connected to the connector, wherein
    the connector and adapter link a wiper blade to a driving arm of a vehicle wiping system, and
    the adapter comprises:
    a head; and a body held together by an attachment device, the head having a U-shaped cross section formed from at least one top wall from which at least two side walls extend, the body having a U-shaped cross section formed from at least one top panel from which at least two side walls extend, wherein the adapter comprises at least one guide which guides the head in linear translation relative to the body before collaboration of the attachment device, at least one of the side walls comprises a cavity with a substantially rectangular opening therein and defining a blind hole that is embedded in the at least one side wall such that all but one face of the cavity is surrounded by the at least one side wall, and the attachment device comprises a locking hole arranged in a side wall of the head that engages with a pin that projects from a surface of one of the at least one side wall of the body.

14. A wiper blade comprising:

an adapter linking the wiper blade to a driving arm of a vehicle wiping system, wherein the adapter comprises:

a head; and a body held together by an attachment device, the head having a U-shaped cross section formed from at least one top wall from which at least two side walls extend, the body having a U-shaped cross section formed from at least one top panel from which at least two side walls extend, wherein the adapter comprises at least one guide which guides the head in linear translation relative to the body before collaboration of the attachment device, at least one of the side walls comprises a cavity with a substantially rectangular opening therein and defining a blind hole that is embedded in the at least one side wall such that all but one face of the cavity is surrounded by the at least one side wall, and the attachment device comprises a locking hole arranged in a side wall of the head that engages with a pin that projects from a surface of one of the at least one side wall of the body.

* * * * *